United States Patent [19]
Morison

[11] Patent Number: 4,538,177
[45] Date of Patent: Aug. 27, 1985

[54] AUTOMATIC EQUIPMENT

[75] Inventor: John M. Morrison, Edinburgh, Scotland

[73] Assignee: plc Ferranti, London, England

[21] Appl. No.: 553,970

[22] Filed: Nov. 21, 1983

[30] Foreign Application Priority Data

Nov. 27, 1982 [GB] United Kingdom ............... 8233908

[51] Int. Cl.³ .............................................. H04N 7/18
[52] U.S. Cl. ................................... 358/101; 356/400; 358/93; 364/474
[58] Field of Search ................... 358/101, 106, 107, 93; 356/400; 364/474, 516, 551, 552, 580

[56] References Cited

U.S. PATENT DOCUMENTS

| 4,301,470 | 11/1981 | Pagany | 358/101 |
| 4,352,125 | 9/1982 | Guth | 358/101 |
| 4,389,669 | 6/1983 | Epstein | 358/101 |

FOREIGN PATENT DOCUMENTS

| 1334128 | 10/1973 | United Kingdom . |
| 1445745 | 8/1976 | United Kingdom . |
| 1448881 | 9/1976 | United Kingdom . |
| 2039030 | 7/1980 | United Kingdom . |

*Primary Examiner*—Howard W. Britton
*Attorney, Agent, or Firm*—Kerkam, Stowell, Kondracki and Clarke

[57] ABSTRACT

Automatic equipment, in which each of a plurality of identical devices is positioned automatically to co-operate with processing means and/or test probes, has a TV camera considered as being arranged to move in a raster scan over each device, and to provide signals in response to detecting boundaries of an orthogonal pattern of device features. Initially, with a unique pattern of feature boundaries having been determined, and possibly by reference to the representation, provided by a display unit driven by the camera, of a manually, accurately, located device, there is caused to be generated, in each frame scan period, pairs of signals, individually corresponding to, and representative of a defined location for, a determined feature boundary, each signal representing a marker boundary as if detected by the camera. For each subsequent device, automatically, at least, coarsely positioned, if each determined feature boundary is detected by discriminating means, operating upon the corresponding pair of signals and the signal from the camera in response to detecting the determined feature boundary, not to be within a threshold distance of its defined location, the device is caused to be displaced automatically along the appropriate orthogonal axis, or axes, to become capable of co-operating with the processing means and/or test probes. The latter condition is obtained when the discriminating means detects that each of the determined feature boundaries are within the threshold distances of their defined locations.

2 Claims, 4 Drawing Figures

AUTOMATIC EQUIPMENT

This invention relates to automatic equipment to be employed in the fabrication and/or testing of devices, and in particular to perform, repetitively, and automatically, a fabrication step, and/or a testing step, and/or a sequence of such steps, on a plurality of identical devices, the automatic equipment including processing means, and/or test probes.

The devices may be electrical devices, and usually are unpackaged.

There may be laborious, and repetitive, fabrication steps, and/or testing steps, to be performed on each of the plurality of identical devices, and it is desirable to perform these steps automatically.

It is an object of the present invention to provide automatic equipment whereby the required, repetitive, fabrication steps and/or testing steps can be performed satisfactorily in an automatic manner upon a plurality of identical devices in sequence, when it is essential that each device is precisely positioned within the automatic equipment, as hereinafter defined in relation to automatic equipment in accordance with the present invention, relative to the co-operative parts of the automatic equipment, comprising processing means and/or test probes, so that the required steps can be performed satisfactorily, it being required that such precise positioning of the plurality of identical devices is obtained automatically, after each device automatically has been, at least, coarsely positioned within the automatic equipment, also as hereinafter defined in relation to automatic equipment in accordance with the present invention.

An example of a fabrication step to be performed repetitively on identical devices by the automatic equipment is the trimming of thin film resistors, to a required value, or values. The fabrication step to be performed repetitively may comprise the consecutive trimming of the same resistor in each of the plurality of identical devices, the devices either being discrete, or in the form of a regular, monolithic, array of devices. Alternatively, a plurality of identical devices to be operated upon, repetitively, by the automatic equipment, each may have a plurality of constituent resistors to be trimmed consecutively, the constituent resistors possibly having different shapes and/or being required to have different resistances.

Each device to be operated upon within the automatic equipment in accordance with the present invention, before being located within the automatic equipment, has features, provided by initial fabrication steps, and generally in a plane of the device. The features may be on a substrate providing generally the plane of the device. The feature boundaries are capable of being detected by a known form of inspection means included within the automatic equipment, the inspection means having a radiation sensitive device comprising, for example, a TV camera, driving a visual display unit. Further, there are orthogonal axes associated with the device plane.

In the operation of the automatic equipment to which the present invention relates, a first device is located, usually as accurately as possible, by an operator, so as to be capable of co-operating with the co-operative parts comprising processing means and/or test probes provided within the automatic equipment. Each identical device subsequently considered, initially is automatically, at least, coarsely positioned within the automatic equipment, as hereinafter defined. It is required that the device is precisely positioned, also as hereinafter defined, and if not so located initially, it is required that the device automatically is displaced, in the appropriate manner to become precisely positioned, by device displacing means included within the automatic equipment. The device displacing means is controlled in the desired way by other constituent parts of the automatic equipment, including the known inspection means referred to above.

When a device is a constituent part of a regular, monolithic, array of identical devices, for example, on a common substrate, and with the first device located, usually as accurately as possible, by an operator within the automatic equipment, so as to be capable of co-operating with the processing means and/or the test probes, each other constituent device, of each monolithic array, consecutively, is, at least, coarsely positioned automatically, in sequence, by a conventional step-and-repeat mechanism of the automatic equipment. The arrangement of the automatic equipment also may be such that the first device to be considered of each subsequent monolithic array is, at least, coarsely positioned automatically within the automatic equipment.

Unpackaged electrical devices, to be operated upon within the automatic equipment to which the present invention relates, each may comprise an at least substantially planar substrate, usually rectangular, or square, shaped in plan, on at least one major surface of which substrate are provided elements comprising a pattern of conductors, and, possibly, there are also provided electrical components, comprising thin film components, and/or thick film components, and/or packaged components such as semiconductor components. The conductor pattern, and the constituent electrical components, if provided, comprise a required circuit assembly. Each such unpackaged electrical device, because of the presence of the at least substantially planar substrate, can be considered as extending generally in a plane, and having two major, substantially planar, surfaces, each such major device surface being provided by a major substrate surface, together with the conductor pattern, and electrical components, if provided, on the major substrate surface. It is conventional that the constituent device features, comprising such a conductor pattern, and electrical components, if provided, of such a major device surface, or surfaces, and when viewed in plan, have only straight line boundaries; and further, usually, the axes of symmetry, or constituent straight line portions, together comprising the whole of the axes of symmetry, of the device features, the features forming an orthogonal pattern, extend parallel to, or are coincident with, one or other of the two orthogonal axes of symmetry of the rectangular, or square, shaped in plan substrate. Further, there can be considered to be orthogonal axes associated with a device plane which is not rectangular, or square, shaped in plan.

Any form of device to be operated upon within automatic equipment in accordance with the present invention, and whether comprising an unpackaged electrical device, or not, and whether including a substrate, or not, is required to have constituent features detectable by the radiation sensitive device, the features having only straight line boundaries, and axes of symmetry, or constituent straight line portions, together comprising the whole of the axes of symmetry, the features forming an orthogonal pattern, and extending parallel to, or coincident with, one or other of what are considered to be orthogonal axes associated with a plane including the device features. Each device is required to have a shape in plan which enables it to co-operate with means, provided within the automatic equipment to which the present invention relates, so as to be located without any angular misalignment in relation to the two orthogonal axes of the device plane. Further, if a monolithic regular array of devices is provided, it is required that the array has a shape in plan enabling it to be located so that each constituent device is located without any angular misalignment in relation to the two orthogonal axes of each device. For convenience, such devices are referred to as devices of the kind referred to.

According to the present invention automatic equipment, to be employed in association with, by being employed in the fabrication and/or testing of, devices of the kind referred to, the automatic equipment including means for locating each device within the automatic equipment without any angular misalignment in relation to two orthogonal axes of a plane including device features, and including displacing means by which each device is displaceable within the automatic equipment, along either orthogonal axis of the device plane, and relative to co-operative parts of the automatic equipment, comprising processing means and/or test probes, and the automatic equipment also has inspection means having a radiation sensitive device, at least considered as, being arranged to move, at a constant speed, and in relation to each device, individually, along a predetermined raster scanning path of parallel lines in a plane, parallel to the plane including device features, there being two orthogonal axes of symmetry associated with the raster scanning pattern, one such axis being parallel to the scanning lines, and both axes being parallel to the two orthogonal axes of the plane including the device features, and the radiation sensitive device is arranged to produce signals in response to the detection of boundaries of features in the plane of the device; the inspection means also includes manually adjustable marker generating means, arranged to provide associated pairs of groups of signals, with each group including at least one signal, and for convenience, can be considered to be at least one associated pair of signals within each associated pair of groups of signals, in each raster scan period, the interval between the signals of each such associated pair of signals representing a particular distance of movement of the radiation sensitive device, along an axis parallel to one of the two orthogonal axes of the raster scan pattern, so that each such associated pair of groups of signals represents a marker within the raster scan pattern, considered as being capable of being superimposed upon the device plane, and considered as being detectable by the radiation sensitive device, in addition to the detection thereby of the device feature boundaries, possibly there being different markers representing different particular distances at different locations within the raster scan pattern, possibly, there being different particular distances associated with the two orthogonal axes, each signal produced by the marker generating means representing a marker boundary line in the raster scan pattern considered as being detected by the radiation sensitive device simultaneously with the production of the signal; in an initial setting operation of the automatic equipment, with an operator having determined a unique pattern of feature boundaries, including a plurality of feature boundaries, and/or points of intersection of feature boundaries, in the plane of each device, the operator adjusts the marker generating means to produce a plurality of associated pairs of groups of signals, each of the associated pairs of groups of signals, considered individually, defining a location within the raster scan pattern of a determined feature boundary of the unique pattern of feature boundaries, the location possibly being, of a feature boundary of a determined point of intersection of feature boundaries, in relation to each determined point of intersection of feature boundaries, there being, considered to be, two corresponding markers, represented by two associated pairs of signals, the two different such associated pairs of groups of signals representing two different movements of the radiation sensitive device at right angles to each other, in relation to each device positioned within the automatic equipment, and considered sequentially, the defined location of a feature boundary being considered to be a line in the raster scan pattern extending parallel to the orthogonal axis parallel to the feature boundary, and equidistant between the lines in the raster scan pattern represented by the corresponding associated pairs of groups of signals, and the adjustment of the marker generating means by the operator to be such that the feature boundary location defining line, in the raster scan pattern, is within a predetermined distance from the desired accurate location of the feature boundary in the raster scan pattern, and along an axis parallel to the orthogonal axis at right angles to the feature boundary, possibly, the predetermined distance being zero when the device is accurately located, and/or possibly there being different predetermined distances associated with the two orthogonal axes, different markers being so adjusted in relation to different determined feature boundaries of the unique pattern of feature boundaries, each of the determined feature boundaries, individually, having a marker so adjusted in relation thereto; the automatic equipment also including discriminating means to operate upon, individually, each combination of related signals produced by the inspection means, each such a combination of related signals comprising the associated pair of groups of signals from the marker generating means corresponding to a feature boundary, together with a signal from the radiation sensitive device indicative of the detection of the feature boundary, in relation to each device, at least, coarsely positioned within the automatic equipment, as defined below, and each device being considered sequentially, the discriminating means being arranged to be capable of detecting whether, or not, individually, each of the plurality of determined feature boundaries of the unique pattern of feature boundaries, is located within a threshold distance from the defined location of the feature boundary, and along an axis parallel to the orthogonal axis at right angles to the feature boundary, possibly, there being different threshold distances associated with the two orthogonal axes, but each threshold distance being at most equal to half the appropriate particular distance; the automatic equipment is set up, possibly by the operator, such that, when the discriminating means operates upon each combination of related signals associated with any device, and when each of the plurality of determined feature boundaries, considered individually, is detected by the discriminating means to be within an appropriate combined distance from its desired accurate location within the automatic equipment, the appropriate combined distance comprising the appropriate threshold distance plus the appropriate predetermined distance, the device is located within the automatic equipment so as to be inherently capable of co-operating with the co-operative parts of the automatic equipment, comprising the processing means and/or the test probes, and, then, in relation to any device instantaneously being considered, when the discriminating means detects that each of the plurality of determined feature boundaries is within the appropriate combined distance from its desired accurate location, or within the appropriate threshold distance from its defined location, the device is considered to be precisely positioned within the automatic equipment; and the automatic equipment includes means whereby each of a plurality of identical devices, sequentially, and automatically, is, at least, coarsely positioned within the automatic equipment, the device being located so as not to be inherently capable of co-operating with the co-operative parts of the automatic equipment, comprising the processing means and/or the test probes, each device being considered to be coarsely positioned when the discriminating means is capable of operating upon each combination of related signals associated with the device, for example, in relation to the appropriate orthogonal axis, either each signal indicative of the detection of an appropriate feature boundary, considered individually, being produced by the inspection means between the corresponding associated pairs of groups of signals, or no other signal being produced by the inspection means between the production of the signal indicative of the detection of the appropriate feature boundary and the corresponding associated pairs of groups of signals, but, in response, the discriminating means detecting that at least one of the plurality of determined feature boundaries is not located within the appropriate threshold distance from its defined location in the raster scan pattern; in a constituent error determining step, of a device positioning operation of the automatic equipment, the discriminating means detect whether, or not, the device is precisely positioned within the automatic equipment, and in response to the detection by the discriminating means that the device is not so precisely positioned, the discriminating means, which is arranged to control the device displacing means, causes the displacing means to displace the device, whereby the device, at least approaches, being precisely positioned within the automatic equipment, possibly the constituent error determining step being repeated automatically in the device positioning operation, until the discriminating means detects that the device is precisely positioned within the automatic equipment.

The present invention will now be described by way of example with reference to the accompanying drawings, in which.

Figure 1:
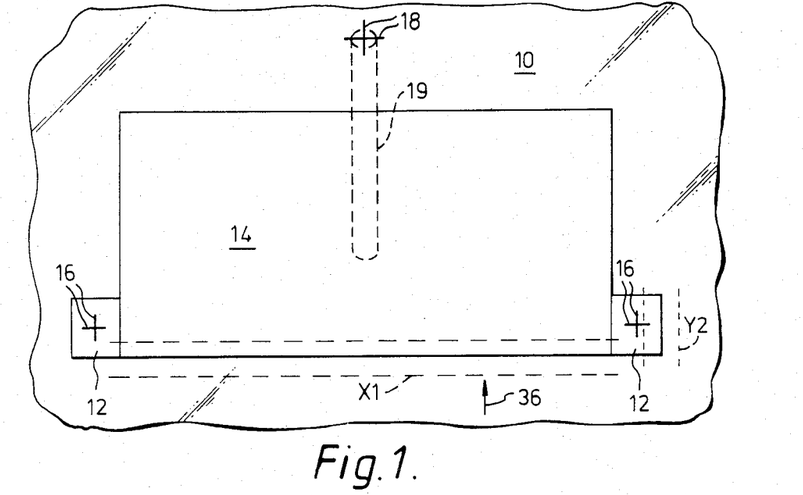
FIG. 1 is the representation of a thin film resistor device of the kind referred to, and the representation is provided by a visual display unit, of inspection means also including a TV camera, of one embodiment of automatic equipment in accordance with the present invention, the resistor to be tested and trimmed within the automatic equipment.

The thin film resistor device of the kind referred to, and providing the representation shown in FIG. 1, is formed from a blank comprising an at least substantially planar substrate 10 of electrically insulating material, such as glass, with two opposing major surfaces, one major surface being coated successively with thin superimposed layers, one layer being of a conductive material, such as gold, and provided on a layer of a resistive material, such as a chromium-nickel alloy. First the conductive layer is photolithographically etched to provide gold contacts 12 of the resistor, and then the resistive part of the thin film resistor 14 is formed by photolithographically etching the chromium-nickel resistive layer. Portions of the chromium-nickel resistive layer remaining beneath the gold contacts 12 are without any effect. When the resistor device is considered individually the substrate is rectangular, or square, shaped in plan; and all the feature boundaries of the device are parallel to side walls comprising the periphery of the substrate. This latter criterion is ensured by the form, and the fabrication precision, associated with the masks employed in the photolithographic etching steps; and by the precision with which the masks are located over the blank. The contacts 12, and the resistive part 14, comprise constituent features of the device.

A monolithic regular array (not shown), of a plurality of identical such resistor devices, is provided on an initially common substrate. When the manufacture of the resistor devices is completed, the initially common substrate is divided, in any convenient manner, to separate the resistor devices, each individual resistor device being provided on a rectangular, or square, shaped in plan substrate. The initially common substrate is also rectangular, or square, shaped in plan; and all the feature boundaries of the constituent devices are parallel to the side walls comprising the periphery of the common substrate. In one particular embodiment, the common substrate is 5 centimeters square in plan. There are 900 constituent resistors, each substantially rectangular shaped in plan, and each on a substrate having a square shape in plan when the resistor is in a discrete form. The resistors are arranged in rows and columns of 30 devices each, in the regular array on the common substrate. The blank from which the regular array of devices is formed is mounted in a jig supported upon a worktable, and the worktable is arranged to move along an axis parallel to one orthogonal axis of symmetry of the required array, and along an axis parallel to the other orthogonal axis of symmetry of the required array, relative to the masks employed in the photolithograhic process steps. The worktable, and hence the blank, are moved in a conventional step-and-repeat manner relative to the masks employed in the photolithographic process steps, so that the required array of a plurality of resistors is fabricated on the common substrate.

The constituent device features, comprising the contacts 12 and the resistive part 14, of each of the regular array of devices, when viewed in plan, form an orthogonal pattern, and have only straight line boundaries; and further, the axes of symmetry, or constituent straight line portions, together comprising the whole of the axes of symmetry, of the device features, extend parallel to one or other of the two orthogonal axes of symmetry of each rectangular, or square, shaped in plan substrate of the subsequently separated resistor device, and also of the two orthogonal axes of symmetry of the initially integral, common substrate for the plurality of devices.

Each individual resistor comprises an unpackaged electrical device. Because of the presence of the at least substantially planar substrate 10, the device can be considered as having two major, substantially planar, surfaces, and one such major device surface is provided by a major substrate surface, together with the resistive material 14 and the contacts 12 thereon, and is referred to as the plane of the device. The orthogonal axes of symmetry of the device are considered to be the orthogonal axes of the device plane.

Figure 4:
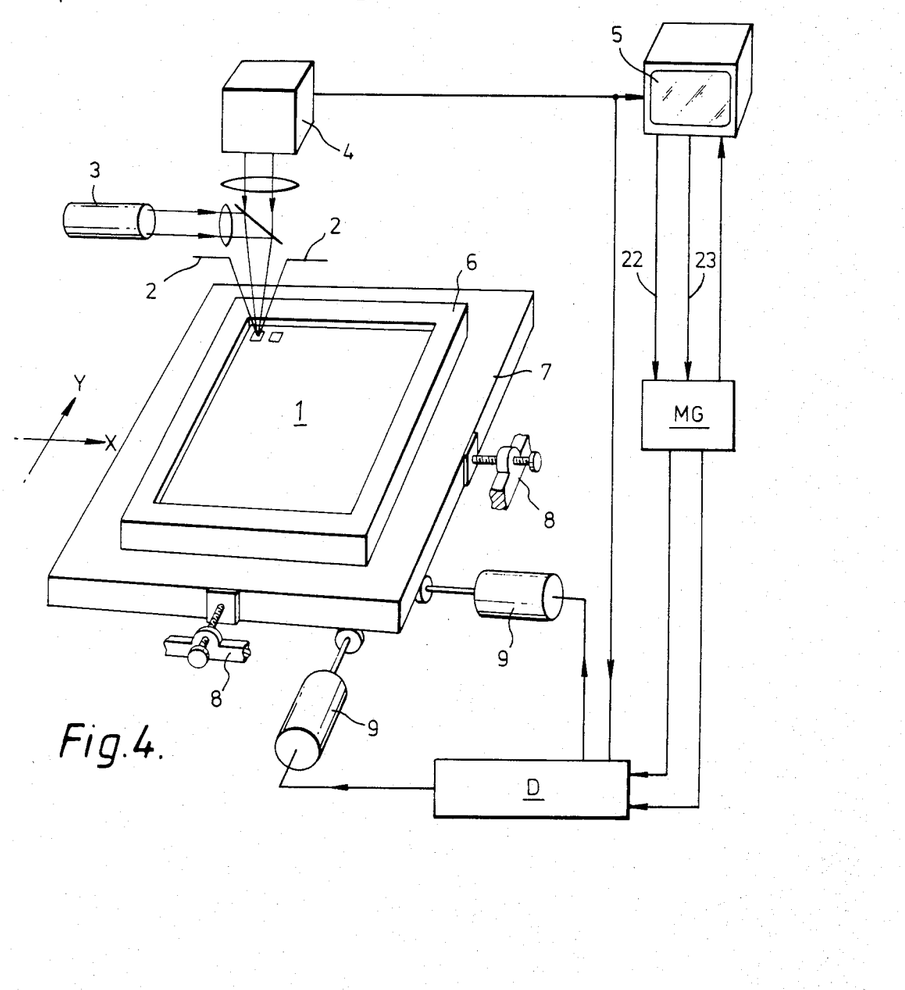
FIG. 4 shows the automatic equipment.

Before separating the resistors, it is required to trim the resistance of each resistor, to provide a required resistance to an accuracy of ±0.02%. One embodiment of automatic equipment in accordance with the present invention, shown in FIG. 4, is to perform this operation on the monolithic regular array 1, of devices. Hence, the automatic equipment includes testing apparatus with two probes 2 arranged such that, when each device individually is precisely positioned, as herein defined, within the automatic equipment, the test probes can be lowered, automatically, to make good electrical contact with the resistor contacts 12, and the resistance of the device can be determined. If the resistance is too high the device is rejected, because it is impossible to trim the device to have the required resistance. If the resistance is too low a laser 3 is employed to trim the device, so that it has the desired resistance to the required degree of accuracy. Thus, the automatic equipment also includes processing means comprising conventional laser trimming apparatus. It is required that each device, individually, is precisely positioned, as herein defined, within the automatic equipment both in relation to the laser 3, and the test probes 2, so as to be inherently capable of co-operating with the laser and the test probes. The laser is moved automatically, from an initial, rest, position, to traverse partially across the width of the resistor, etching a channel in the resistive material 14, at right angles to the longitudinal axis of symmetry of the rectangular shaped resistor, until the testing apparatus, including the two probes, determines that the resistor has the required resistance. The laser trimming apparatus is controlled by the testing apparatus, so that the traverse of the laser across the width of the resistor is stopped automatically when the resistor has the required resistance, as determined by the testing apparatus. The testing apparatus also causes the laser to be switched ON and OFF, and to be returned to its initial, rest, position, when the trimming action is completed. Subsequently, the test probes are removed automatically from the device, and the whole operation is to be performed repetitively, and individually, and on each identical device of the monolithic regular array, and of other such monolithic regular arrays.

The automatic equipment also includes means by which each resistor device can be inspected, individually, the inspection means having a radiation sensitive device comprising a TV camera 4, and a visual display unit 5, providing the representation of the resistor device shown in FIG. 1. The inspection means provides the representation of the resistor device by the TV camea, at least being considered as, being arranged to move, at a constant speed, along a predetermined raster scanning pattern of parallel lines, relative to the device, in a plane parallel to the device plane referred to above. The representation provided is a magnification of the field of view of the TV camera. In between each raster line scan there is a short fly-back period, and in between each raster frame scan there is another short fly-back period. The TV camera moves along scan lines comprising axes parallel to one orthogonal axis of symmetry of the raster pattern, considered to be the X orthogonal axis; and the TV camera is stepped along an axis parallel to the other orthogonal axis of symmetry of the raster pattern, considered to be the Y orthogonal axis, in the fly-back period between each raster line scan.

The first monolithic array 1 of resistors is mounted in a jig 6, on a worktable 7, within the automatic equipment, with the first of the constituent resistors capable of being scanned by the TV camera, in the required manner, and a representation of the resistor is provided by the visual display unit of the inspection means. The mounting jig ensures that the resistor is not angularly misaligned in relation to the orthogonal axes of the device plane. Further, the orthogonal axes of the device plane are parallel to, or co-incident with, the orthogonal axes associated with the raster scan pattern of the inspection means.

The resistor-bearing surface of the first resistor of the monolithic regular array of resistors is uniformly illuminated with visible radiation, and light reflected at the surface is received by the TV camera. The greatest intensity of light is reflected at the surface of the gold contacts 12, the least intensity of light is reflected at the surface of uncoated portions of the glass substrate 10, and an intermediate intensity of light is reflected at the surface of the resistive material 14. Consequently, in the representation of the resistor, provided by the visual display unit of the inspection means, the contacts 12 comprise light regions, uncoated portions of the substrate 10 comprise dark portions, and the resistive material 14 comprises a portion which is less light than the contacts. The feature boundaries are sharp, there being abrupt transitions in the intensities of light received by the TV camera. Signals are provided from the TV camera, and each is considered to be indicative of the detection of a feature boundary, such a signal being considered as being provided in response to the initiation of the scan line in which a feature boundary parallel to the X orthogonal axis is detected, although possibly not being provided instantaneously with the initiation of the scan line; and in relation to a feature boundary parallel to the Y orthogonal axis, such a signal is provided in response to the detection of a corresponding abrupt transition in the intensities of light received by the TV camera, in any one of the line scans in which such a detection occurs. Such signals are produced in any known way, and are operated upon within the automatic equipment in the manner described below.

Cross wires, produced electronically, and to represent the locations of the test probes, and of the initial, rest, position of the laser, in relation to the raster scan pattern, respectively, are indicated at 16 and 18 in FIG. 1, and as superimposed upon the representation of the resistor provided by the visual display unit. The cross wires are present in the display whether a representation of a resistor is provided, or not. The possible laser trimming path is indicated in dotted line form at 19 in FIG. 1, but is not represented in the display.

The worktable of the automatic equipment is arranged to move along an axis parallel to the X orthogonal axis of the raster scanning pattern, and of the device plane; and along an axis parallel to the Y orthogonal axis of the raster scanning pattern, and of the device plane.

In an initial setting operation, the first resistor is located by the operator within the automatic equipment relative to the mean, rest, position of the laser, and to the test probes to be lowered to the resistor contacts, so as to be capable of co-operating with the test probes and the laser. Manually adjustable lead screws 8, shown in FIG. 4, are employed for this purpose, and the operator observes the representation of the resistor, with the cross wires 16 and 18, respectively, representative of the test probes, and the laser, and provided by the visual display unit, for this purpose. By adjusting the lead screws, the operator displaces the device relative to the TV camera of the inspection means. Subsequently, the required precise positioning, as herein defined, of each identical resistor of the same, or different arrays, is performed automatically, in the manner described below, without any adjustment being required of the lead screws, and without any necessity for the operator to observe the representation of the resistor provided by the visual display unit.

The representation of the device shown in FIG. 1 is of the device accurately located within the automatic equipment. Ideally, but not essentially, the operator locates the first resistor as accurately as possible within the automatic equipment, and relative to the test probes, and the laser; and more accurately than is required merely to ensure that the device is inherently capable of co-operating with the test probes and the laser, and the device being considered to be precisely positioned as herein defined.

By observing the representation of the first resistor provided by the visual display unit, or previously, the operator also determines a unique pattern of feature boundaries of the device, between uncoated portions of the glass substrate 10 and the gold contacts 12, or the resistive material 14. For convenience, feature boundaries between the gold contacts 12 and the resistive material 14 are not considered when determining the unique pattern of feature boundaries.

With the illustrated resistor a suitable unique pattern only comprises two determined feature boundaries. One determined feature boundary is designated X1 in FIG. 1, and is the longer of the boundaries between the rectangular shaped resistive material 14 and the substrate 10, remote from the initial, rest position of the laser, and is parallel to the X orthogonal axis of the device. The other determined feature boundary is designated Y2, and is the boundary of one of the gold contacts 12 and the substrate 10, remote from the resistive material 14, and is parallel to the Y orthogonal axis of the device. Although the boundaries X1 and Y2 are indicated in FIG. 1, they are not indicated in any special way in the representation of the resistor provided by the visual display unit, but are readily identified by the operator observing the representation, including the cross-wires, 16 and 18, representing, respectively, the test probes and the laser.

Further in the initial setting operation, marker generating means, indicated at MG in FIG. 4, of the inspection means of the automatic equipment is manually adjusted by the operator to produce signals representing markers to be superimposed upon the unique pattern of determined feature boundaries within the representation of the first resistor provided by the visual display unit, for example, when the device is accurately located within the automatic equipment, as shown in FIG. 1. In FIG. 1 the two markers are each shown as two spaced dotted lines extending along the corresponding determined feature boundaries.

Figure 2:
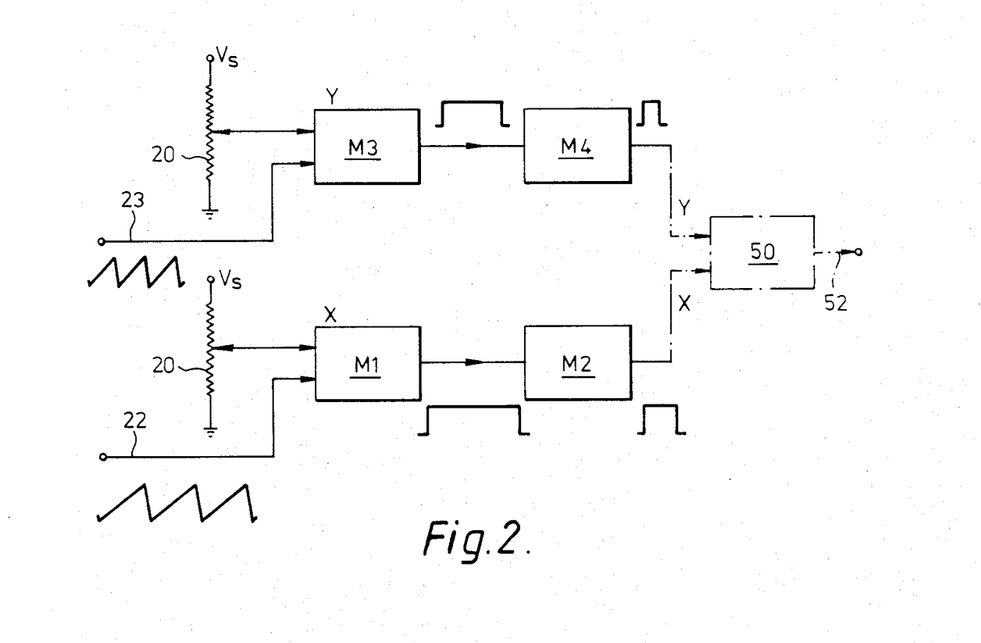
FIG. 2 is a block diagram of part of marker generating mens of the inspection means of the automatic equipment, the marker generating means producing signals representing markers within the raster scan pattern associated with the TV camera of the inspection means, and each marker defining a location within the display, provided by the visual display unit, for a corresponding feature boundary of a unique pattern of determined feature boundaries of the device of FIG. 1.

The marker generating means is shown partially in FIG. 2, and comprises X-generating parts and Y-generating parts. Each such part of the marker generating means includes a manually adjustable potentiometer 20, with a reference potential $V_s$ applied across the potentiometers.

In each X-generating part of the marker generating means, one such part being shown in FIG. 2, one input of a voltage-controlled monostable device M1 is connected to the wiper of the associated potentiometer 20. A second input of the monostable M1 is connected to the visual display unit of the inspection means, and receives the frame time-base signals therefrom on a wire 22, the time-base signals having a saw-tooth waveform. At each occurrence when the voltage of the saw-tooth waveform is greater than the potential at the wiper of the potentiometer 20, the state of the monostable M1 changes, until a frame fly-back part of the waveform is obtained. Thus, in each frame scan by the TV camera the monostable M1 produces a pulse, the leading edge of which pulse is determined by the setting of the potentiometer 20. The output of the monostable M1 is supplied to a gate, not shown, the gate also being arranged to receive the line time-base signals on a wire 23. The arrangement is such that there is produced from the gate, in response to each pulse from the monostable M1, a corresponding pulse which is initiated at the start of a line scan period. The pulse duration comprises the remaining portion of the frame scan period. The output of the voltage controlled monostable device M1 is connected to the input of a monostable device M2, via the date. The monostable M2 is triggered to change its state at the leading edge of each pulse it receives from the monostable M1, via the gate, and remains in this state for a predetermined time, which is short compared with the frame scan period. Hence, the output of the monostable M2 is a pulse of a predetermined duration in each frame scan period, and the leading edge of each such pulse is determined by the setting of the potentiometer 20. Usually, the duration of each pulse from the monostable M2 is of an odd plural number of line scan periods.

In each Y-generating part of the marker generating means, one such part being shown in FIG. 2, and which has a similar construction to each X-generating part, the second input of the voltage controlled monostable device M3 receives the scan line time-base signals from the visual display unit on the wire 23. The scan line time-base signals also have a saw-tooth waveform, and at each occurrence when the voltage of the saw-tooth waveform is greater than the potential at the wiper of the associated potentiometer 20, the state of the monostable M3 changes, until a fly-back part of the waveform between consecutive scan lines is obtained. Thus, in each line scan by the TV camera the monostable M3 produces a pulse, the leading edge of which pulse is determined by the setting of the potentiometer 20, and the pulse duration comprises the remaining portion of the line scan period. The monostable device M4, connected to the output of the voltage controlled monostable device M3, is triggered to change its state at the leading edge of each pulse it receives from the monostable M3, and remains in this state for a predetermined time, which is short compared with the line scan period. Hence, the output of the monostable M4 is a pulse of a predetermined duration in each line scan period, in each frame scan period, and the leading edge of each pulse is determined by the setting of the potentiometer 20.

The saw-tooth waveforms, and pulse forms, shown in FIG. 2 are representational only, and do not indicate the actual relative durations of these waveforms.

In relation to each X-generating part of the marker generating means, the pulse of a duration comprising a plurality of line scan periods initiated at the start of a line scan period, in each frame scan period of the TV camera, is arranged to comprise a bright-up video signal to the visual display unit. Thus, the marker generating means causes there to be produced a bright band, comprising a visual marker, within the display provided by the visual display unit. The visual marker is produced within the display irrespective of whether a representation of a device is provided, or not, by the visual display unit. However, in the initial setting operation of the automatic equipment, and with the first resistor, for example, as illustrated, accurately located within the automatic equipment, the marker is superimposed upon the representation of the resistor provided by the visual display unit. In particular, the marker is superimposed upon a corresponding determined feature boundary within the representation, the operator adjusting the potentiometer 20 of the X-generating part of the marker generating means accordingly. The marker superimposed upon the X1 determined feature boundary can be considered as the X1 marker. The lines comprising the relevant boundaries of the marker are indicated in FIG. 1 as the two spaced dotted lines extending along the X1 determined feature boundary. Hence, the X1 marker extends parallel to the X orthogonal axis of the raster scan pattern, and to the X orthogonal axis of the device plane.

In relation to each Y-generating part of the marker generating means, the pulse produced in each line scan period, of each frame scan period, of the TV camera, also is arranged to comprise a bright-up video signal to the visual display unit. Thus, the marker generating means causes there to be produced a bright band, comprising a visual marker, within the display provided by the visual display unit. Again, the visual marker is produced within the display irrespective of whether a representation of a device is provided, or not, by the visual display unit. However, in the initial setting operation of the automatic equipment, the marker is superimposed upon a corresponding feature boundary within the representation of the first resistor, the operator adjusting the potentiometer 20 of the Y-generating part of the marker generating means accordingly. The marker superimposed upon the Y2 determined feature boundary can be considered as the Y2 marker. The lines comprising the relevent boundaries of the marker are indicated in FIG. 1 as the two spaced dotted lines extending along the Y2 determined feature boundary. Hence, the Y2 marker extends parallel to the Y orthogonal axis of the raster scan pattern, and to the Y orthogonal axis of the device plane.

In this manner there is provided, within the representation provided on the screen of the visual display unit, a unique pattern of markers corresponding to the unique pattern of determined feature boundaries.

In addition, each part of the marker generating means, considered individually, in each raster scan frame of the TV camera, can be considered as producing associated pairs of groups of signals, representing the marker produced by the part of the marker generating means. In relation to the part of the marker generating means producing the X1 marker, each group has only one signal, and one such signal produced represents the initiation of the line scan including either of the dotted lines of FIG. 1 representing the X1 marker. The other signal is considered as being provided in response to the initiation of the scan line in which the trailing edge of the pulse occurs. These signals are passed to discriminating means, indicated at D in FIG. 4, of the automatic equipment, and described below.

In relation to the part of the marker generating means producing the Y2 marker, each such signal produced comprises either the leading, or the trailing, edge of each pulse, produced in each line scan period, in each raster scan period. Thus, in each raster scan period, there are associated pairs of groups of signals, one associated pair of signals being produced in each line scan period, but, for convenience, only one associated pair of signals can be considered as being produced in the raster scan period.

The interval between each associated pair of signals, produced by each X-generating part, and each Y-generating part, of the marker generating means, is considered as representing a particular distance of movement of the TV camera at right angles to the orthogonal axis designating the corresponding part of the marker generating means, the movement of the TV camera so represented being parallel to the Y orthogonal axis for an X-generating part, and vice versa. The particular distance is proportional to the spacing between the corresponding two dotted lines shown in the representation of FIG. 1.

There may be different particular distances associated with the two orthogonal axes, the characteristics of the monostable devices M2 and M4, determining the different particular distances. Further, the particular distances associated with different X-generating parts, if provided, and/or different Y-generating parts, if provided, may be different.

Further, each such signal represents a dotted line of FIG. 1, representing a line comprising a marker boundary, whereby the production of the signal can be considered as representing the simultaneous detection of the marker boundary line by the TV camera within the raster scan pattern.

It is not essential that the marker generating means produces visual markers within the display provided by the visual display unit, but it is only essential that the marker generating means produces the associated pairs of signals, corresponding to the determined feature boundaries, and supplied to the discriminating means. As stated above, the unique pattern of determined feature boundaries may be obtained without observing the representation of the resistor provided by the visual display unit, and similarly, in the initial setting operation, it is not necessary to adjust the marker generating means in the required manner in relation to the resistor representation. Instead the required, unique marker pattern, considered as being capable of being superimposed upon the resistor representation, but, possibly, not visually represented, is set up electronically in any convenient way, to conform to the unique pattern of determined feature boundaries. The marker pattern is required to be in relation to the raster scan pattern, and not a resistor representation in the display provided by the visual display unit. However, with the illustrated embodiment, it is convenient to set up the required marker pattern, electronically within the raster scan pattern, by observing the visual representations of the markers superimposed on the resistor representation, of the accurately located first resistor, and adjusting the visual markers accordingly. Thus, if the operator adjusts the potentiometers 20 so that the visual markers are superimposed upon the determined feature boundaries, in the representation of the accurately located first resistor, as accurately as possible, thereby the required marker pattern is set up electronically, and as accurately as possible, in relation to the raster scan pattern. Subsequently, as indicated above, the display provided by the visual display unit is not examined.

In addition, each associated pair of signals produced by the marker generating means, conveniently, can be considered as defining a location of the corresponding determined feature boundary, the defined location comprising a line extending parallel to the orthogonal axis parallel to the feature boundary, and equidistant between the lines in the raster scan pattern, comprising the dotted lines in FIG. 1, representing marker boundaries, and represented by the associated pair of signals. The defined location is within the raster scan pattern, and, possibly, is within the representation of the resistor provided by the visual display unit.

If the operator can adjust the marker generating means so that the defined locations of the determined feature boundaries are accurate, then each line considered as representing a marker boundary is at half the appropriate particular distance from the accurate location. However, in practice, and whether the resistor representation is inspected or not, the operator cannot reliably adjust the marker generating means so that each of the defined locations of the determined feature boundaries, considered individually, is accurate, but only so that the defined location is within a predetermined, and possibly empirically determined, distance of the desired accurate location of the feature boundary. The predetermined distance is zero when the defined location comprises the accurate location. The predetermined distance is at right angles to the orthogonal axis designating the part of the marker generating means producing the corresponding associated pair of signals, as with the corresponding particular distance, comprising the spacing between the boundaries of the corresponding marker, and is in either direction from the accurate location of the determined feature boundary. The predetermined distance may be finite because the marker generating means is not adjusted accurately; and/or because the first resistor is inaccurately located in relation to the test probes and the laser, when the marker generating means is adjusted by inspecting the representation of the first resistor provided by the visual display unit, possibly, the operator not attempting so to locate the first resistor as accurately as possible. However, for convenience, it will be considered that the operator can locate the first resistor accurately in relation to the test probes and the laser.

There may be different predetermined distances associated with the two orthogonal axes, and the predetermined distances associated with the different markers parallel to the X orthogonal axis, if provided, and/or parallel to the Y orthogonal axis, if provided, may be different.

The associated pairs of signals produced by both X-and Y-generating parts of the marker generating means comprise outputs of the inspection means; in addition to the signals from the TV camera of the inspection means, indicative of the detection of feature boundaries of the device, and also supplied to the discriminating means.

Hence, in relation to each determined feature boundary, X1 or Y2, of the device, there can be considered to be a combination of three related signals from the inspection means, in each frame scan period. One such signal comprises the signal from the TV camera, indicative of the detection by the TV camera of the determined feature boundary; and the other two signals comprise the corresponding associated pair of signals from the appropriate part of the marker generating means, and considered as being representative of the TV camera detecting the dotted lines of FIG. 1, representing the boundaries of the corresponding marker. In relation to the X1 determined feature boundary, the related signals are produced, once in each frame scan period, at the initiation of the appropriate line scans. In relation to the Y2 determined feature boundary, the related signals are produced, in each frame scan period, in each of the line scans in which the determined feature boundary is intersected by the raster scanning pattern, but the related signals produced in only one such line scan need be considered.

The initial setting operation is now completed. Subsequently, the required testing operation, and, if required, the laser trimming operation, is performed on the first resistor.

It is then required to perform automatically the required testing operation, and, if required, the laser trimming operation, individually, upon each subsequently considered, identical, resistor. In particular, it is required that each subsequently considered resistor, of the same monolithic regular array of devices, and of each subsequent array, automatically is positioned precisely, as herein defined, within the automatic equipment, so as to be capable inherently of co-operating with the test probes and the laser.

A conventional step-and-repeat mechanism is provided within the automatic equipment, the step-and-repeat mechanism being similar to that employed in the photolithographic etching of the regular monolithic arrays of devices. The second considered resistor of the first monolithic array of identical devices, automatically, is moved within the automatic equipment, in a known way, by the step and repeat mechanism, and in order to be located so as to be capable of being operated upon within the automatic equipment. However, the accuracy of the step-and-repeat operation is such that, possibly the second resistor is not precisely positioned within the equipment, as herein below defined, and so is not inherently capable of co-operating with the test probes and the laser. But, the accuracy of the step-and repeat operation is required to be such that the second resistor is, at least, coarsely positioned, as herein below defined, within the automatic equipment, which criterion, conveniently, can be obtained.

If the representation of a resistor coarsely positioned within the automatic equipment is observed on the screen of the visual display unit, the arrangement must be such that, it can be seen that, in relation to each determined feature boundary, considered individually, and in relation to the appropriate orthogonal axis at right angles to the determined feature boundary, the determined feature boundary either is within the associated marker boundaries, represented by the dotted lines shown in FIG. 1; or no feature boundary, or other marker boundary, is between the determined feature boundary and its associated marker boundaries. Hence, the discriminating means is capable of operating upon the corresponding related signals in the required manner. As described below, this required condition inherently is required to be fulfilled when the device is, at least, coarsely positioned within the automatic equipment, and the automatic equipment is set up in the required manner as described in greater detail below.

However, at least one visual marker may not be uniformly bisected by the corresponding determined feature boundary within the representation provided by the visual display unit, and possibly at least one visual marker may not be superimposed upon the corresponding determined feature boundary, when a device is coarsely positioned within the automatic equipment. The discriminating means detects whether, or not, such misalignment of the device is so that the device is not inherently capable of co-operating with the test probes, and the laser, and the device is not precisely positioned, as defined below.

The discriminating means for the illustrated resistor form, having two determined feature boundaries, comprises two discriminators, one discriminator being associated with the X1-generating part of the marker generating means, and the other discriminator being associated with the Y2-generating part. Thus, each discriminator of the discriminating means, individually, is associated with a corresponding one of the two markers X1 ans Y2. The arrangement shown in FIG. 3 includes the discriminator individually associated with the X1 marker. The unillustrated Y2 discriminator is identical.

Figure 3:
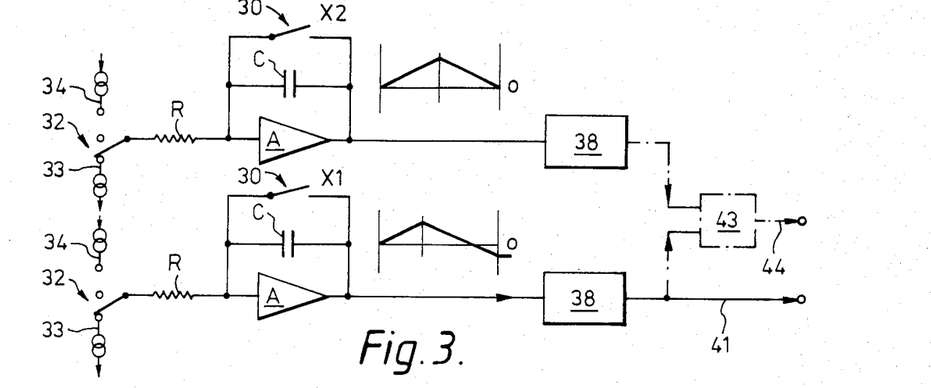
FIG. 3 is a block diagram of part of discriminating means of the automatic equipment, device displacing means being controlled in the appropriate manner, to cause an initially coarsely positioned device automatically to be precisely positioned within the automatic equipment, in response to signals from the discriminating means.

Each discriminator receives, individually, in each frame scan period, the combination of related signals, as referred to above, and associated with the determined feature boundary corresponding to the discriminator. Thus, each discriminator receives, individually, the corresponding pair of associated signals, from the marker generating means. Each discriminator also receives the video signals from the TV camera, including the signals corresponding to the detection of the feature boundaries extending parallel to the appropriate orthogonal axis, and, in particular, the signal corresponding to the detection of the determined feature boundary corresponding to the pair of associated signals also received by the discriminator. The arrangement is such that the signals corresponding to the detection of feature boundaries extending at right angles to the associated determined feature boundary are not operated upon within the discriminator. As shown in FIG. 3, each discriminator includes an integrator in parallel with a switch 30. The integrator comprises an operational amplifier A in parallel with a capacitor C. The switch 30 is arranged to be opened in response to the recept, on a wire (not shown), of the first of the associated pair of signals from, say, the X1-generating part of the marker generating means, and the switch is arranged to be closed in response to the second of the associated pair of signals. The integrator is arranged to integrate potentials corresponding to the video signals, the potentials being supplied to the integrator via a bipolar switch arrangement, indicated generally at 32, and a resistor R. The bipolar switch arrangement 32 is actuated, in response to the receipt of the least intensity video signals, representative of the detection by the TV camera of uncoated glass substrate portions of the device, to supply a constant, negative potential, on a wire 33, to the integrator; and in response to the receipt of greater intensity video signals, representative of the detection of gold contact portions, or of resistive portions, of the device, to supply a constant, positive potential, on a wire 34, to the integrator. The signals from the TV camera representative of the detection of the feature boundaries, and, hence, representative of abrupt transitions between the least intensity video signals and the greater intensity video signals, each causes the bipolar switch arrangement 32 to be actuated in the appropriate manner. For example, the video signals are supplied to a comparator (not shown), of the bipolar switch arrangement 32. When the least intensity video signals are received thereby the potential level of the comparator output is low, and associated gating means (not shown), causes the wire 33 to be connected to the integrator. When the greater intensity video signals are received by the comparator, the potential level of the comparator output is high, and the associated gating means causes the wire 34 to be connected to the integrator. Thus, the arrangement is such that a signal, comprising an abrupt transition in the voltage of such video signals, corresponding to an abrupt transition in detected intensities by the TV camera, causes the bipolar switch arrangement to be actuated in the appropriate direction.

In the case of a discriminator connected to an X-generating part of the marker generating means, the bipolar switch arrangement 32 is arranged to be actuated only in response to the detection of feature boundaries extending parallel to the associated determined feature boundary, by being arranged to be actuated only at the start of the appropriate line scan periods, and in particular at the start of each line scan period after an abrupt transition of detected radiation intensities by the TV camera say, the first occurence of an abrupt transition from the lowest intensity level to a higher intensity level, or the last occurence of an abrupt transition from a higher intensity level to the lowest intensity level. For example, the gating means referred to above, of the bipolar switching arrangement, is enabled by synchronising signals from the inspection means.

In the case of a discriminator connected to a Y-generating part of the marker generating means, the bipolar switch arrangement 32 is arranged to be actuated only in response to the detection of feature boundaries extending parallel to the associated determined feature boundary, by being arranged to be actuated only along an appropriate predetermined portion of the length of a line scan. Only the first appropriate line scan, in which occurs an abrupt transition of detected radiation intensities by the TV camera, say, from a higher intensity level to the lowest intensity level, in the appropriate predetermined portion thereof, is considered, identical signals produced in other, subsequent, line scans are not operated upon by the discriminator.

In the operation of the appropriate discriminator, and with the TV camera moving over the device, and being considered as moving over the marker X1, in the direction of the arrow 36 in FIG. 1, when the switch 30 is opened upon receipt of the first of the associated pair of signals, considered as being representative of the TV camera crossing the first dotted line marker boundary, a negative potential is on the wire 33, representative that the TV camera is over uncoated portions of the glass substrate 10. The negative potential is supplied to the integrator, and is started to be integrated. The output potential of the amplifier A rises steadily, from zero. When the TV camera crosses the glass substrate-resistive material boundary X1, and an abrupt transition occurs in the detected radiation intensity, the bipolar switching arrangement 32 is caused to be switched over, and the positive potential on the wire 34 is supplied to the integrator. The output potential of the amplifier A now steadily falls, until the second of the associated pair of signals, considered as being representative of the TV camera crossing the second dotted line marker boundary, and the last of the combination of related signals, is received, the switch 30 is closed, and the integration ceases. The other, unillustrated, discriminator operates in a similar manner in relation to the receipt of the Y2 marker signals, and the crossing of the corresponding, determined feature boundary, parallel to the Y axis of the raster scan pattern, by the TV camera.

In FIG. 3 there are shown two discriminators, the second discriminator being provided for a second marker X2, extending parallel to the X orthogonal axis, but not employed with the resistor form of FIG. 1.

For convenience, in FIG. 3 there is shown the output waveform of an integrator if the determined feature boundary corresponding to the X2 marker is detected by the TV camera exactly mid-way between the receipt of the associated pair of signals corresponding to the X2 marker, the integrator output waveform being a symmetrical sawtooth, starting and finishing with the integrator output potential being zero. In contrast, there is also shown in FIG. 3, the output waveform of an integrator when the corresponding determined feature boundary is detected by the TV camera at less than mid-way between the receipt of the associated pair of signals, corresponding to the X1 marker pulse, the integrator output waveform not being a symmetrical sawtooth, and, although starting with the integrator output potential being zero, the integrator output finishes with a finite negative potential value. Similarly, if the corresponding determined feature boundary is detected by the TV camera at more than mid-way between the receipt of the associated pair of signals corresponding to the X1 marker pulse, the integrator output finishes with a finite positive potential value.

If the TV camera crosses a determined feature boundary by initially passing over a contact, or the resistive material, before passing over the uncoated glass substrate portions, the positive potential on the wire 34 is supplied first to the integrator. Thus, the senses of the potentials of the waveforms at the output of the integrator are opposite to those described above in corresponding circumstances.

If a feature boundary is not detected by the TV camera between the receipt of the corresponding associated pair of signals from the marker generating means, the integrator output potential increases positively, or negatively, where appropriate, until the integration ceases upon the receipt of the second of the associated pair of signals.

The integration steps for each discriminator, considered individually, are performed repetitively, in consecutive frame scan periods, in response to the receipt of each combination of related signals from the inspection means, and corresponding to the determined feature boundary associated with the discriminator.

Each discriminator includes a comparator 38 connected to the output of the integrator. The arrangement is such that each comparator 38 determines, in response to the receipt by the discriminator of each associated combination of related signals, whether or not each output potential from the associated integrator, at the termination of each integration step, is greater than a predetermined threshold magnitude, irrespective of the sense of the integrator output potential. In response, the comparator provides a corresponding output signal, for example, by the comparator either providing a pulse, or not. For convenience, hereinafter, the term integrator output potential is employed to refer to the potential at the termination of each integration step. Further, the comparator 38 indicates the sense of each output potential from the associated integrator, if the output potential is greater than the predetermined threshold magnitude, for example, by the sense of any pulse provided by the comparator. The predetermined threshold magnitude corresponds to the corresponding determined feature boundary being detected within a threshold distance of the location of the determined feature boundary defined by the corresponding part of the marker generating means. Hence, the predetermined threshold magnitude corresponds to the threshold distance at right angles to the orthogonal axis parallel to the associated marker, and in either direction from the defined location of the determined feature boundary. The predetermined threshold magnitude can not correspond to the integrator output potential when the associated determined feature boundary of the device is located at a particular position, as detected by the TV camera, not between the boundaries of the associated marker.

There may be different threshold distances associated with the two orthogonal axes, the characteristics of the different provided comparators 38 determining the different threshold distances. Further, the threshold distances associated with different X markers, if provided, and/or different Y markers, if provided, may be different.

For a marker to be superimposed upon the corresponding determined feature boundary within the representation of FIG. 1 it is required that the associated threshold distance is at most equal half to the appropriate particular distance. As indicated above, the corresponding discriminator is not capable of operating effectively upon the associated combination of related signals if the marker is not superimposed upon the corresponding determined feature boundary.

However, it is required that the combined distance, of the appropriate threshold distance plus the appropriate predetermined distance, for each determined feature boundary, considered individually, must be such that, when the discriminating means operates upon each combination of related signals from the inspection means, in a frame scan period; and when each of the determined feature boundaries is within the appropriate combined distance from its desired accurate location within the automatic equipment, the device is located within the automatic equipment so as to be inherently capable of co-operating with the test probes and the laser. Thus, it is required that the automatic equipment is arranged so that this criterion is obtained in relation to the second device, and each subsequently considered identical device. The threshold distance comprises a constant of the discriminating means of the automatic equipment; and the predetermined distance is a constant associated with the manner of use of the automatic equipment by the operator, and is related to the appropriate associated pair of signals produced by the marker generating means. The particular distance also comprises a constant, of the marker generating means, but is not so important. One, or more, of such constants may be adjustable by the operator when the automatic equipment is set up. Consequently, it is required that the automatic equipment, including the step-and-repeat mechanism, is designed so that, for any device form envisaged as being required to be operated upon within the automatic equipment, and possibly after adjustment of the automatic equipment by the operator, appropriate constants, comprising the predetermined distance, the threshold distance, and possibly also the particular distance, can be provided. The appropriate constants are such that the device is located within the automatic equipment so as to be inherently capable of co-operating with the test probes, and the laser, when each determined feature boundary of the unique pattern, considered individually, is within the appropriate combined distance from the corresponding accurate location of the determined feature boundary for co-operating with the test probes and the laser; and the automatic equipment is required to be so set up. In particular, the predetermined distance obtainable easily, by the operator, must not be greater than the maximum possible designed predetermined distance.

It is now possible to restate what is considered to be the precise positioning of a device within the automatic equipment, instead of the device being stated to be inherently capable of co-operating with the test probes and the laser when precisely positioned. As referred to in the preceding paragraph, the automatic equipment is required to be arranged that, and the design of the automatic equipment is required to be that such an arrangement can be obtained, when each determined feature boundary of the unique pattern, considered individually, is within the appropriate combined distance of the required accurate location of the determined feature boundary for co-operating with the test probes and the laser, the device is located so as to be inherently capable of co-operating with the test probes and the laser. Thus, the device is to be considered as being precisely positioned within the automatic equipment when each determined feature boundary, considered individually, is within the appropriate combined distance of the required accurate location of the determined feature boundary for co-operating with the test probes and the laser, with the automatic equipment being set up in the required way.

When the discriminating means, in response to the receipt of a combination of related signals from the inspection means, detects that the corresponding determined feature boundary is within the appropriate combined distance from its desired accurate location within the automatic equipment, the determined feature boundary is also within the appropriate threshold distance from its corresponding location defined by the corresponding associated pair of signals from the marker generating means.

Consequently, with the automatic equipment set up in the required way, it is possible to consider that a device is precisely positioned within the automatic equipment when the discriminating means detects, in response to the receipt of each combination of related signals from the inspection means, in a frame scan period, that each of the determined feature boundaries of the unique pattern, considered individually, is within the appropriate threshold distance from the corresponding defined location of the determined feature boundary, represented by the corresponding associated pair of signals from the marker generating means.

As stated above, when the step-and-repeat mechanism, included within the automatic equipment, automatically moves the second resistor of the monolithic array, so as to be capable of being operated upon by the automatic equipment, it is required that the second resistor is, at least, coarsely positioned, as herein below defined, and may be precisely positioned, as herein above defined.

When the discriminating means, in response to the receipt of each combination of related signals from the inspection means, in a frame scan period, detects that at least one determined feature boundary of the unique pattern is not within the appropriate threhshold distance from the corresponding defined location, the device is not capable of co-operating with the test probes and the laser. Then the device being inspected within the automatic equipment is considered to be coarsely positioned, if the discriminating means is capable of operating upon the combinations of related signals, the appropriate condition, stated above in this respect, being fulfilled.

When the second resistor is at least coarsely positioned within the automatic equipment, as defined in the preceding paragraph, the device being located by the step-and-repeat mechanism, in a device positioning operation of the automatic equipment, and, in particular, in a constituent error determining step of the device positioning operation, in response to the receipt of the combinations of related signals from the inspection means, in a frame scan period, the discriminating means detects that the second resistor either is precisely positioned, as defined above, and is inherently capable of co-operating with the test probes and the laser; or is not precisely positioned, and cannot co-operate with the test probes and the laser.

If, in the device positioning operation of the automatic equipment, in a first constituent error determining step, the second resistor is detected by the discriminating mens as being precisely positioned within the automatic equipment, as defined above, subsequently, and automatically, in response to a signal from the discriminating means produced in the manner described below, and supplied to the test probes and the laser, the testing operation, and, if required, the laser trimming operation, is performed on the second resistor.

However, if in the first constituent error determining step, the second resistor is detected by the discriminating means as being only coarsely positioned within the automatic equipment, as defined above, subsequently, and automatically, in response to a signal from the discriminating means produced in the manner described below, and supplied to device displacing means of the automatic equipment, the second resistor is caused to be displaced automatically, at least to tend, to be become precisely positioned, as defined above.

In order that the initially coarsely positioned second resistor can be precisely positioned within the automatic equipment, it is required that the worktable supporting the regular array of devices is to be moved, by the device displacing means, automatically parallel to the X orthogonal axis of the raster scan pattern, and/or is to be moved automatically parallel to the Y orthogonal axis of the raster scan pattern.

The device displacing means comprises reversible stepping motors indicated at 9 in FIG. 4, with one such motor individually being associated with each orthogonal axis of the raster scanning pattern, and of the device, different orthogonal axes being associated with different motors. With the illustrated resistor form, the output of the comparator 38 of the X1 discriminator is connected to the stepping motor arranged to move the worktable parallel to the Y orthogonal axis. The output of the comparator of the unillustrated Y2 discriminator is connected to the stepping motor arranged to move the worktable parallel to the X orthogonal axis.

Each comparator output signal, and supplied to the displacing means, comprises a pulse, and is indicative of the corresponding integrator output potential being greater than the predetermined threshold magnitude. The sense of the comparator output pulse also indicates the sense of the integrator output potential. Thus, in the first constituent error determining step, of the device positioning operation, the pulse, or pulses, received by the stepping motors determines the displacements of the worktable, the directions of the displacements corresponding to the senses of the pulses. In response to each pulse the worktable is moved a fixed distance along the appropriate orthogonal axis, in the required direction. The fixed distance is less than the particular distance represented by the time between the corresponding associated pair of signals from the corresponding part of the marker generating means. Hence, the displacement, or displacements, of the worktable, respectively, along one, or both, orthogonal axes, in response to the receipt by the discriminating means of the combinations of related signals, produced in a frame scan period, causes the initially coarsely positioned device to become precisely positioned, or to become closer to being precisely positioned.

In a second error determining step the discriminating means detects, in response to the receipt of the combinations of related signals, corresponding to the displaced device, in a further frame scan period, whether or not the device is now precisely positioned. If it is detected that the device is now precisely positioned, in response a signal is produced in the manner described below, the testing operation, and, if required, the laser trimming operation, is performed. If the device is not precisely positioned, the worktable is displaced again so that the device at least tends to become precisely positioned. Thus, the constituent error determining steps, of the device positioning operation, are repeated, until it is detected that the device is precisely positioned, the discriminating means produces the required signal, and the device positioning operation is completed.

The signal required to be produced by the discriminating means, when the discriminating means detects that a device is precisely positioned, and the device positioning operation is completed, is provided by gating means included within the discriminating means. With the resistor having only the X1 and Y2 determined feature boundaries, the arrangement is such that the outputs of the comparators 38 are connected to common gating means comprising an OR gate (not shown), in addition to being connected to the device displacing means. If a pulse is supplied by either comparator to actuate a motor of the device displacing means, no signal is passed to the test probes and the laser by the common gating means. However, if no comparator produces a pulse, the common gating means supplies the required signal to the test probes and the laser, to enable them.

Subsequently, the testing operation, and, if required, the laser trimming operation, is performed on the second resistor.

The step-and-repeat mechanism automatically then moves the third considered resistor to be at least coarsely positioned within the automatic equipment, in the same manner as with the second resistor. Automatically the device positioning operation, testing operation, and, if required, laser trimming operation, all as described above, are performed on the third resistor.

When all the resistors of a regular monolithic array have been tested and trimmed, the array is removed from the automatic equipment, and the common substrate is scribed, and the resistors separated from each other.

Another regular monolithic array of resistors, with the constituent resistors identical to the resistors of the first array, is placed in the mounting jig provided within the automatic equipment. Thereby the first resistor to be considered of the second array automatically is appropriately coarsely positioned within the automatic equipment, as referred to above, and the automatic equipment causes the first resistor, automatically, to be precisely positioned, without any action of the operator being required. This operation can be repeated for each regular array of the identical devices. Each monolithic array of resistors may be placed automatically in the mounting jig.

The form of the devices to be operated upon within the automatic equipment may be such that the unique pattern of feature boundaries determined by the operator has more than two feature boundaries. There is required to be a constituent marker generating part, and a discriminator, individually, associated with each determined feature boundary. In order that the automatic equipment is of general application, there may be included in the automatic equipment a plurality of constituent marker generating parts, and a corresponding plurality of discriminators. Thus, the operator may determine complex unique patterns of feature boundaries, if required. It is not essential that each constituent marker generator part, and discriminator, is employed.

As indicated above, FIG. 3 shows the arrangement of two discriminators associated with X1 and X2 markers, both extending parallel to the X orthogonal axis, when the unique pattern associated with a device includes two determined feature boundaries, both extending parallel to the X orthogonal axis. The two discriminators are identical. The bipolar switching arrangements 32 of both the illustrated discriminators receive simultaneously the same video signals, but the switches 30 are arranged to be operated by signals from different marker generating parts. Both integrators have associated therewith the same predetermined threshold magnitude. The comparators 38 are connected to common gating means, indicated generally at 43. In response to the receipt of a signal from each comparator, the gating means 43 provides a signal, on an output wire 44, indicative of whether or not both corresponding integrator output potentials are less than the associated predetermined threshold magnitudes.

A signal indicative of only one of the corresponding integrator output potentials, when the integrator output potential is greater than the associated predetermined threshold magnitude, is provided on a wire 41 from the output of the comparator 38 associated with the integrator receiving the X1 marker signals.

Both the wires 41 and 44 are connected to the device displacing means.

Because the device being operated upon instantaneously is incapable of being angularly misaligned within the automatic equipment, either both integrators produce output potentials greater than the associated predetermined threshold value, or neither integrator produces such an output potential. Hence, the arrangement is such that either a pulse is provided on the wire 41 to cause the worktable to move in the appropriate direction, or a signal is provided on the wire 44, from the common gating means 43, indicative that neither integrator output potential is greater than the associated predetermined threshold value. In the latter case, the signal is supplied to the stepping motor capable of displacing the worktable parallel to the Y orthogonal axis, to prevent it from being inadvertently enabled.

The unique pattern associated with a device may comprise, at least partially, determined points of intersection of feature boundaries, for example, because markers associated with determined feature boundaries extend throughout the raster scan pattern, and it may not be possible for the discriminating means to operate satisfactory with a complex unique pattern comprising only determined feature boundaries. Each such determined point of intersection has associated therewith, what can be considered to be, two corresponding markers, represented by two corresponding associated pairs of signals, from two marker generating parts. One of the marker generating generating parts is designated an X-generating part, and produces an associated pair of signals representing a marker which is capable of being represented by a band extending parallel to the X orthogonal axis. The other of the marker generating parts is designated a Y-generating part, and produces an associated pair of signals representing a marker which is capable of being represented by a band extending parallel to the Y orthogonal axis. Such an arrangement is identical to that shown in FIG. 2, in relation to the X1 and Y2, determined feature boundaries. However, in relation to a determined point of intersection of feature boundaries, the point may be designated, say, X1, Y1. As described above, the two illustrated marker generating parts produce separate markers, extending at right angles to each other. In order to produce two markers which together are associated with a determined point of intersection of feature boundaries, the outputs of both the X- and Y- generating parts of the marker generating means are connected to a two input AND gate 50, shown in FIG. 2 in dotted line form. The output of the gate 50 is provided on a wire 52, and sets up the two markers electronically in relation the raster scan pattern. Further, the output of the gate 50 comprises a bright-up video signal, to cause the two markers to be displayed, together, in the form of a bright square, only where the two markers are superimposed on each other on the screen of the visual display unit of the inspection means. Thus, it is facilitated for the discriminating means to operate satisfactorily with a complex unique pattern associated with the device.

In the initial setting operation for the automatic equipment, the operator adjusts the illustrated portion of the marker generating means to cause the centre of the visual representation of the two markers to be superimposed upon the determined point of intersection of feature boundaries within the representation of the first device provided on the screen of the visual display unit of the inspection means, the first device being as accurately located as possible within the automatic equipment. As before the operator is required to adjust the marker generating means, so that in relation to the raster scan pattern, and each marker considered individually, the line equidistant from the marker boundaries represented by the corresponding associated pair of signals from the marker generating means, is within the designed maximum predetermined distance of the required accurate location of the corresponding feature boundary, different markers of the two associated markers being so adjusted in relation to the different corresponding feature boundaries at the determined point of intersection. For the two corresponding discriminators, one is arranged to operate as if associated with a determined feature boundary extending parallel to the X orthogonal axis, as described above; and the other is arranged to operate as if associated with a determined feature boundary extending parallel to the Y orthogonal axis, but only the first line scan within the X marker is considered.

The gating means of the marker generating means, and/or of the discriminating means, each is required to have a form suitable to provide the functions referred to above in relation to the described devices, but for the form of the device being operated upon, and in particular, for the unique pattern of determined feature boundaries, and/or of determined points intersection of feature boundaries, associated with the device being operated upon.

Each constituent part of the marker generating means may have any convenient construction. For example, the marker generating means may operate digitally; and information describing the required markers may be stored in a memory device.

Similarly, each constituent discriminator of the discriminating means may have constructions different from that described above.

Representations of the markers provided upon the screen of the visual display unit of the inspection means, may comprise cross wires instead of having a solid shape.

The automatic equipment in accordance with the present invention may be employed to perform automatically other fabrication or testing steps on a regular array of identical devices, in addition to, or instead of, the resistor testing and trimming steps described above. Each such other fabrication or testing step requires each constituent identical device of the regular array to be precisely positioned within the automatic equipment, and such precise positioning is obtained automatically in the manner described above.

The inspection means may have any convenient construction, and in particular may not include a TV camera as the radiation sensitive device.

The radiation sensitive device of the inspection means may be sensitive to radiation other than radiation in the visible part of the spectrum.

The inspection means may not include a visual display unit.

The device displacing means may have any convenient form.

The device shown in FIG. 1 is simple in construction, and modifications thereof are possible.

The device may comprise a circuit assembly, having a plurality of constituent circuit elements, and a conductor pattern, on the major substrate surface. The conductor pattern is formed simultaneously with, and in the same manner as, the contacts of the resistor of FIG. 1.

Thus, a device to be operated upon within automatic equipment in accordance with the present invention, for example, has seventeen constituent resistors, in the form of a thin film circuit, and the different resistors are required to have different resistances. Once the first such device has been precisely positioned within the automatic equipment, as described above, the device is moved automatically so that each constituent resistor in turn is tested, and trimmed, if required. Hence, the automatic equipment includes means to displace the device automatically, and with sufficient accuracy, relative to the test probes and to the laser, so that each resistor, in turn, is located in a required position relative to the test probes and to the laser. Each identical device, having the seventeen constituent resistors, is only initially precisely positioned within the automatic equipment, in the manner referred to above, and does not require to be so located between the testing of the constituent resistors.

Alternatively, the automatic equpment may include seventeen sets of test probes, and the device after being initially precisely positioned within the automatic equipment, is located such that all the probes are lowered automatically to the resistor contacts. The resistors are then tested in turn, is an automatic testing sequence, and common laser trimming apparatus is actuated as required, to be capable of trimming each constituent resistor. Hence, the laser has a predetermined path in relation to each resistor, from its initial reset, position; and the automatic equipment includes programming means to control the displacement of the laser in the appropriate manner, and in accordance with the order of the resistor to be trimmed in the complete testing and trimming sequence for the device.

The identical devices to be operated upon within the automatic equipment in accordance with the present invention may not be part of a regular monolithic array of identical devices, but comprise initially discrete devices. Hence, the automatic equipment is set up with the first device within the automatic equipment, and the required testing and laser trimming operations are performed on the first device. Then the first device is replaced by the second device, the second device being at least coarsely positioned, in the required manner, within the automatic equipment, by being located within the mounting jig. The second device is then precisely positioned in the same manner as that described above, if required. Subsequently, each discrete device is precisely positioned within the automatic equipment in the same way.

Discrete devices, or monolithic arrays of devices, may be mounted in magazines so as to be placed automatically, and individually, in the mounting jig provided within the automatic equipment. Alternatively, the devices are placed manually in the mounting jig.

The devices to be operated upon the automatic equipment may not be thin film devices, but, conveniently, are thick film devices, or are devices of any other form.

Each device, of the kind referred to, and to be operated upon within automatic equipment in accordance with the present invention, instead of, or in addition to, including resistors, may include other forms of circuit element. The circuit elements may include a pattern of conductors, and/or packaged components, such as semiconductor devices. It may be required that the automatic equipment in accordance with the present invention is to perform testing, and/or fabrication, steps on such other forms of circuit elements.

The automatic equipment may include any required form of fabrication apparatus, equivalent to the laser trimming apparatus described above for operation upon a thin film resistor device, and/or the automatic equipment may include testing apparatus.

It may not be essential that the device includes a substrate bearing features of the device, the device otherwise being considered to have a plane including boundaries of features of the device.

The devices to be tested, and/or otherwise to be operated upon within automatic equipment in accordance with the present invention, may be packaged electrical devices; or may not comprise electrical devices.

Any device, of the kind referred to, and to be operated upon within the automatic equipment is required to have an orthogonal pattern of features, constituent features having only straight line boundaries, and the axes of symmetry, or constituent straight line portions, together comprising the whole of the axes of symmetry, of the device features, extend parallel to, or are coincident with, one or other of what are considered to be orthogonal axes of the plane of the device. Further, each device is required to be mounted in the jig, provided on the worktable of the automatic device, in a predictable manner, without any angular misalignment of the device in relation to the two orthogonal axes of the device plane. Further, if the device is included in a monolithic array of identical devices it is required that the array has an appropriate shape, conforming to the shape of the provided jig, and such that each constituent device is not angularly misaligned in relation to the two orthogonal axes of each device.

Essentially, within automatic equipment to which the present invention relates, radiation is to be incident upon the device, and is either reflected or transmitted by the device before being received by the radiation sensitive device of the inspection means of the automatic equipment.

If the detected radiation is to be reflected by the device only the plane device surface from which the radiation is reflected can be operated upon by the automatic equipment, this comprises the appropriate plane device surface. It is required for such an appropriate plane device surface that the constituent surface portions of different features have different coefficients of reflectivity. It may be that there is only one form of abrupt transition of intensities of radiation, reflected from said appropriate device surface, and capable of being detected by the radiation sensitive device at feature boundaries.

When the radiation received by the radiation sensitive device is transmitted through the device, features provided on both of two major plane surfaces of the device may be inspected, and operated upon.

When the detected radiation is to be transmitted through the device to be inspected, it is required that the different constituent features have different opacities. It is possible with such an arrangement that, where appropriate, wither one plane surface of the device individually, this one major plane device surface comprising either the surface on which the radiation is incident, or the opposite surface on which the radiation is not incident; or both such surfaces of the device simultaneously, may be operated upon by the automatic equipment, but, for convenience, in this specification and the accompanying claims, such inspection of only one, appropriate, plane device surface is referred to. However, such references each will be considered as including a reference to the simultaneous operation upon both plane device surfaces, where appropriate. There may be one or more form of abrupt transition of radiation, transmitted through the device, and capable of being detected by the radiation sensitive device at feature boundaries.

What I claim is:

1. Automatic equipment, to be employed in association with devices each having constituent features detectable by a radiation sensitive device, the features having only straight line boundaries and axes of symmetry, the features forming an orthogonal pattern extending parallel to orthogonal axes associated with a plane including the device features, and each device having a shape in plan enabling it to co-operate with means provided within the automatic equipment so as to be located without any angular misalignment in relation to the two orthogonal axes of the device plane, and the automatic equipment also including displacing means by which each device is displaceable within the automatic equipment, along either orthogonal axis of the device plane, and relative to co-operative parts of the automatic equipment, inspection means having a radiation sensitive device, at least considered as, being arranged to move, at a constant speed, and in relation to each device, individually, along a predetermined raster scanning path of parallel lines in a plane, parallel to the plane including the device features, there being two orthogonal axes of symmetry associated with the raster scanning pattern, one such axis being parallel to the scanning lines, and both axes being parallel to the two orthogonal axes of the plane including the device features, and the radiation sensitive device being arranged to produce signals in response to the detection of boundaries of features in the plane of the device; the inspection means also including manually adjustable marker generating means, arranged to produce associated pairs of groups of signals, with each group including at least one signal, in each raster scan period, the time interval between the signals of each such associated pair of signals representing a particular distance of movement of the radiation sensitive device, along an axis parallel to one of the two orthogonal axes of the raster scan pattern, so that each such associated pair of groups of signals represents a marker within the raster scan pattern, considered as being capable of being superimposed upon the device plane, and considered as being detactable by the radiation sensitive device, in addition to the detection thereby of the device feature boundaries, each marker representing, individually, a particular distance at a location within the raster scan pattern, each signal produced by the marker generating means representing a line in the raster scan pattern considered as being detected by the radiation sensitive device simultaneously with the production of the signal; in an initial setting operation of the automatic equipment, with an operator having determined a unique pattern of feature boundaries, in the plane of each device, the operator adjusts the marker generating means to produce a plurality of associated pairs of groups of signals, each of the associated pairs of groups of signals, considered individually, defining a location within the raster scan pattern of a determined feature boundary of the unique pattern of feature boundaries, in relation to each device positioned within the automatic equipment, and considered sequentially, the defined location of a feature boundary being considered to be a line in the raster scan pattern extending parallel to the orthogonal axis parallel to the feature boundary, and equidistant between the lines in the raster scan pattern represented by the corresponding associated pairs of groups of signals, and the adjustment of the marker generating means by the operator to be such that the feature boundary location defining line, in the raster scan pattern, is within a predetermined distance from the desired accurate location of the feature boundary in the raster scan pattern, and along an axis parallel to the orthogonal axis at right angles to the feature boundary, different markers being so adjusted in relation to different determined feature boundaries of the unique pattern of feature boundaries, each of the determined feature boundaries, individually, having a marker so adjusted in relation thereto; the automatic equipment also including discriminating means to operate upon, individually, each combination of related signals produced by the inspection means, each such a combination of related signals comprising the associated pair of groups of signals from the marker generating means corresponding to a feature boundary, together with a signal from the radiation sensitive device indicative of the detection of the feature boundary, in relation to each device, at least, coarsely positioned within the automatic equipment, as defined below, and each device being considered sequentially, the discriminating means being arranged to be capable of detecting whether, individually, each of the plurality of determined feature boundaries of the unique pattern of feature boundaries, is located within a threshold distance from the defined location of the feature boundary, and along an axis parallel to the orthogonal axis at right angles to the feature boundary, each threshold distance being at most equal to half the appropriate particular distance; the automatic equipment being set up such that when the discriminating means operates upon each combination of related signals associated with any device, and when each of the plurality of determined feature boundaries, considered individually, is detected by the discriminating means to be within an appropriate combined distance from its desired accurate location within the automatic equipment, the appropriate combined distance comprising the appropriate threshold distance plus the appropriate predetermined distance, the device is located within the automatic equipment so as to be inherently capable of co-operating with the co-operative parts of the automatic equipment, and, then, in relation to any device instantaneously being considered, when the discriminating means detects that each of the plurality of determined feature boundaries, is within the appropriate combined distance from its desired accurate location, or within the appropriate threshold distance from its defined location, the device is considered to be precisely positioned within the automatic equipment; and the automatic equipment including means whereby each of a plurality of identical devices, sequentially, and automatically, is, at least, coarsely positioned within the automatic equipment, the device being located so as not to be inherently capable of co-operating with the co-operative parts of the automatic equipment, each device being considered to be coarsely positioned when the discriminating means is capable of operating upon each combination of related signals associated with the device, but, in response, the discriminating means detecting that at least one of the plurality of determined feature boundaries is not located within the appropriate threshold distance from its defined location in the raster scan pattern; in a constituent error determining step, of a device positioning operation of the automatic equipment, the discriminating means detecting whether the device is precisely positioned within the automatic equipment, and in response to the detection by the discriminating means that the device is not so precisely positioned, the discriminating means, which is arranged to control the device displacing means, causing the displacing means to displace the device, whereby the device, at least approaches, being precisely positioned within the automatic equipment, the constituent error determining step being repeated automatically in the device positioning operation, until the discriminating means detects that the device is precisely positioned within the automatic equipment.

2. Automatic equipment as claimed in claim 1 in which the radiation sensitive device of the inspection means comprises a TV camera.

* * * * *